United States Patent [19]

Russell et al.

[11] Patent Number: 4,867,872
[45] Date of Patent: Sep. 19, 1989

[54] AUTOMATICALLY ADJUSTABLE WEIR AND ENVIRONMENTALLY PROTECTED SENSOR

[75] Inventors: Frederick E. Russell; Brandon Russell, both of Elgin, Ill.

[73] Assignee: Protectaire Systems Co., Elgin, Ill.

[21] Appl. No.: 891,139

[22] Filed: Jul. 28, 1986

[51] Int. Cl.[4] .............................................. B01D 21/34
[52] U.S. Cl. .................................. 210/104; 210/242.3; 210/538; 210/540; 210/776
[58] Field of Search ............... 210/104, 105, 538, 540, 210/242.3, 776, 923; 98/115.2; 73/293, 299; 137/406, 413

[56] References Cited

U.S. PATENT DOCUMENTS

| | | | |
|---|---|---|---|
| 3,713,338 | 1/1973 | Kind | 73/293 |
| 3,971,719 | 7/1976 | Peters | 210/104 |
| 4,156,149 | 5/1979 | Vaccari | 73/293 |
| 4,554,070 | 11/1985 | Jordan | 210/242.3 |
| 4,601,833 | 7/1986 | Shubert | 210/104 |
| 4,606,226 | 8/1986 | Krohn | 73/293 |
| 4,610,848 | 9/1986 | Weber | 210/104 |

Primary Examiner—Benoit Castel
Attorney, Agent, or Firm—Fitch, Even, Tabin & Flannery

[57] ABSTRACT

A liquid level sensor for occluded water is provided to detect the surface water level as in a spray booth tank. The water level sensor may control the water level in the tank or it may be used to maintain a relatively constant outflow of water from the tank through a vertically movable weir. The weir is moved in response to changes in the liquid level detected by the sensor which includes an electronic signal sensor capable of detecting a level of a liquid relative thereto. The sensor is mounted in an elongated housing that has its lower end disposed in the liquid in the reservoir. The upper end of the housing is vented to the atmosphere to equalize the pressure between the interior thereof and the atmosphere ambient the housing. A flexible diaphragm is secured to the housing so as to seal the open lower end, and a substantially pure test liquid is held within the housing isolated from the liquid in the reservoir. The flexible diaphragm constricts or expands in response to changing liquid levels in the reservoir so that the level of the test liquid stays substantially the same as that of the level of the liquid in the reservoir. The electronic sensor measures the position of the test liquid and sends an appropriate signal to a control system that actuates the weir to raise or lower it in response to changing liquid levels in the reservoir.

7 Claims, 4 Drawing Sheets

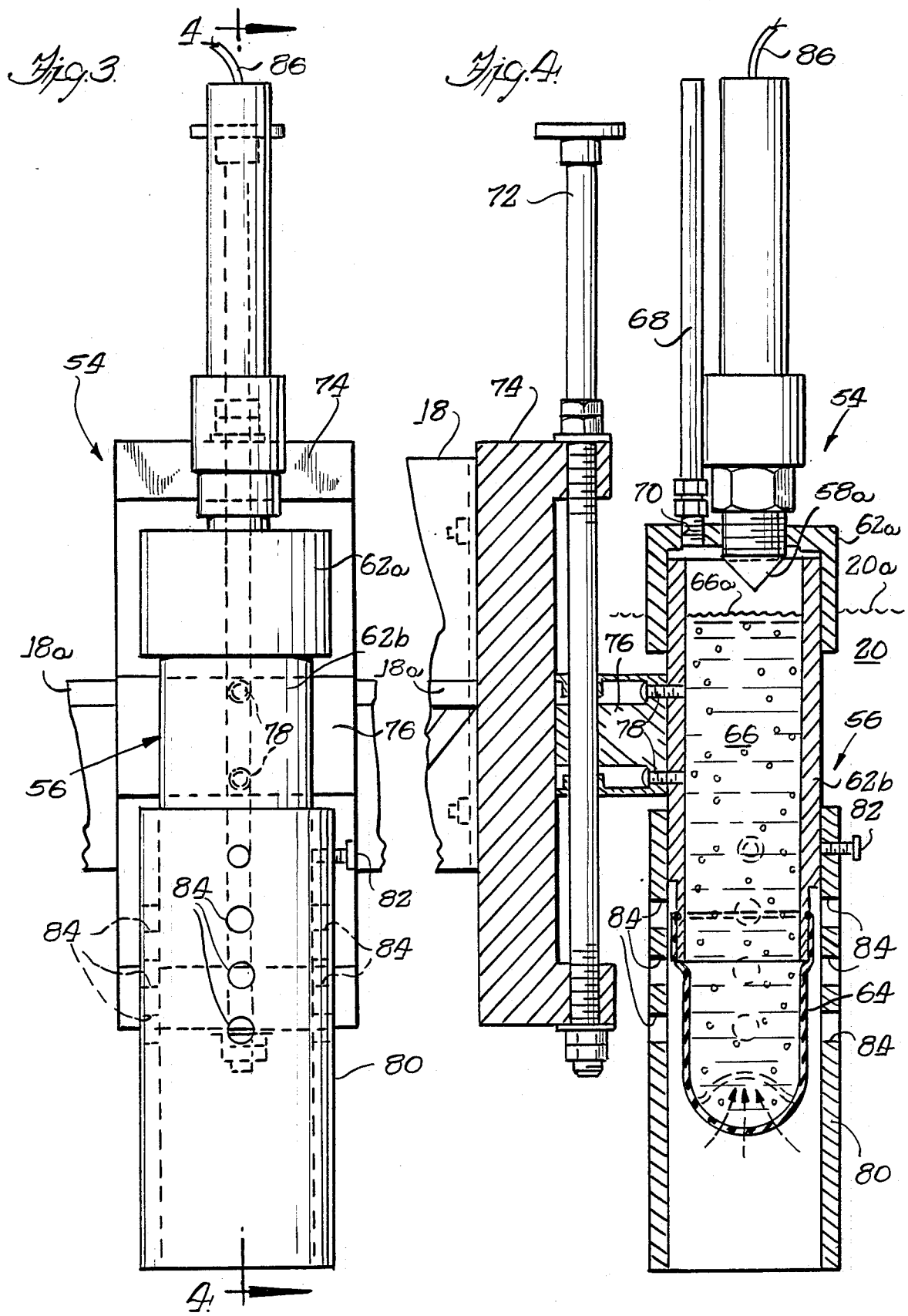

AUTOMATICALLY ADJUSTABLE WEIR AND ENVIRONMENTALLY PROTECTED SENSOR

BACKGROUND OF THE INVENTION

The present invention relates to water treatment devices and, more particularly, to water level sensing and devices controlled thereby to handle contaminated water such as sludge-bearing water from a paint booth or the like.

Industrial spray finishing operations are often conducted in self-contained enclosures having systems for cleaning the air circulated therethrough of overspray particles. A preferred air cleaning system comprises a water wash in which the particulate-laden air is drawn through a falling or cascading water curtain so that the water droplets entrain the overspray particles. Such a system is disclosed in, e.g., U.S. Pat. No. 4,484,513, issued on Nov. 27, 1984, and U.S. Ser. No. 816,144 filed Jan. 3, 1986, which is incorporated herein by reference. In such a spray booth, the trapped overspray particles travel with the wash water to a main holding tank or reservoir from which the water is recirculated to the water washes. Most main holding tanks have chemicals added to the water for agglomerating and floating the overspray particles to form a floating piece of sludge. The floating sludge and a top layer of water on which the sludge floats flow through a weir for removal from the main holding tank and they are pumped to a remotely-located removal or separation unit which often has a skimming device for skimming the sludge from the water in a sludge separation tank. The sludge is then processed to facilitate its recycling, disposal, etc.

In order to maintain a constant flow of sludge-laden water by gravity into the weir sludge separation tank, the weir should be positioned adjacent to, but slightly below, the surface of the water in the main holding tank. However, the water level in the holding tank varies during use due to, e.g., evaporation, and the water level changes most dramatically during the startup of the water wash, when the water level in the main holding tank drops due to the filling of the previously-evacuated piping through which the water for the water wash is circulated or to coat flood sheets and to form air borne water washes in the spray booth. Such rapid or unusual fluctuation in the holding tank water level may interrupt the gravity flow through the weir to the suction pump.

In some instances, it is desired to control the outflow of water and sludge through a weir from a single main collection tank to a separate sludge or occluded water tank, the skimmer blade being at the latter tank. In other instances, as in downdraft booths, the collected water and sludge in the respective main holding tanks pass through a weir at each tank and are pumped directly from several booths to a common sludge separation tank at which sludge is skimmed by a weir and sent to a tank at which is located the skimmer blade. In either event, the weir level for skimming is desired to be controlled.

Complicating the control of water level in tanks for a floating sludge is the fact that the sludge is a very sticky substance which quickly plates over and covers a level sensor with scum and sludge.

Although sensors are available to detect water levels, such as electrical sensors, float switches, optical probes, or sonic sensors, these generally will not work because the wash water in the reservoir is contaminated with the floating, agglomerated overspray particles, as well as foam and other flotsam. Such impurities or contaminants may coat the sensor or create a false surface higher than the water level to be gauged, thus making the sensor ineffective in accomplishing its purpose.

SUMMARY OF THE INVENTION

Accordingly, it is the principal object of the present invention to provide an improved system for maintaining a predetermined flow of liquid through a weir in response to changing water levels.

More particularly, it is an object to provide a liquid-level sensing device that operates accurately to detect the level of contaminant-laden water and adjusts the position of a skimming weir.

These objects, and others that will become apparent upon reference to the accompanying drawings and following detailed description are provided by a liquid level sensor to sense the level of occluded liquid such as sludge bearing sludge separation tank in a water of a spray booth. The liquid level sensor may be secured to a gravity feed inlet for a reservoir including an adjustable weir. The weir is moved in response to changes in the liquid level detected by the sensor which includes an electronic sensor capable of detecting a level of a liquid relative thereto. The sensor is mounted in an elongated housing that has its lower end disposed in the liquid in the reservoir. The upper end of the housing is vented to the atmosphere to equalize the pressure between the interior thereof and the atmosphere ambient the housing. A flexible diaphragm is secured to the housing so as to seal the open lower end, and a substantially pure test liquid is held within the housing isolated from the liquid in the reservoir. The flexible diaphragm constricts or expands in response to changing liquid levels in the reservoir so that the level of the test liquid stays substantially the same as that of the level of the liquid in the reservoir. The electronic sensor measures the position of the test liquid and sends an appropriate signal to a control system that actuates the weir to raise or lower it in response to changing liquid levels in the reservoir.

BRIEF DESCRIPTION OF THE FIGURES OF THE DRAWINGS

FIG. 3 is an enlarged front view of the environmentally-protected water level sensor forming a part of the present invention;

FIG. 4 is a side view of the sensor of FIG. 3;

DETAILED DESCRIPTION OF THE PREFERRED EMBODIMENT

Figure 2:
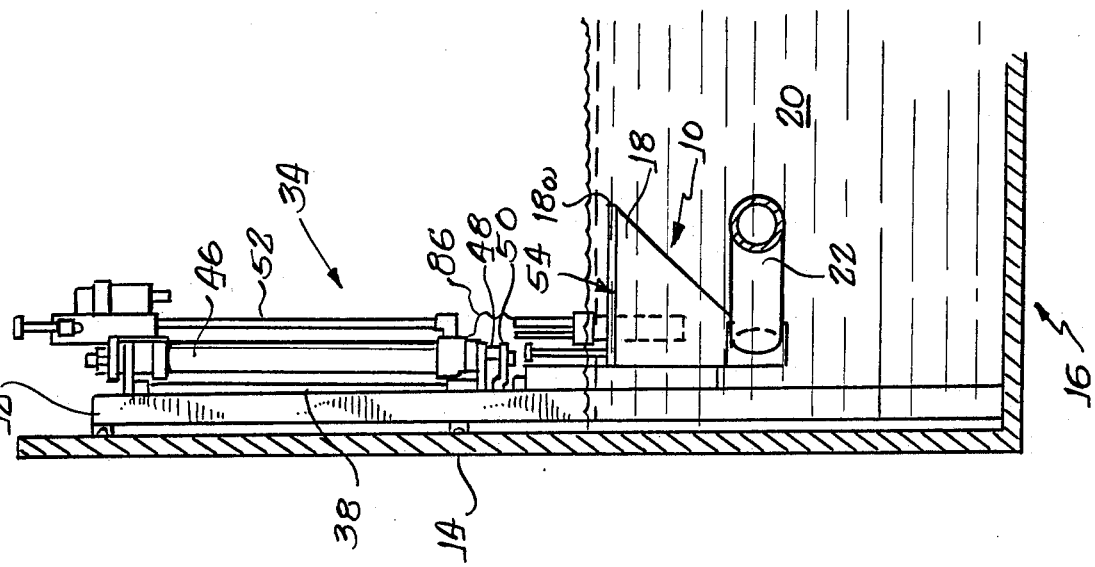
FIG. 2 is a side view of the device of FIG. 1.
Figure 1:
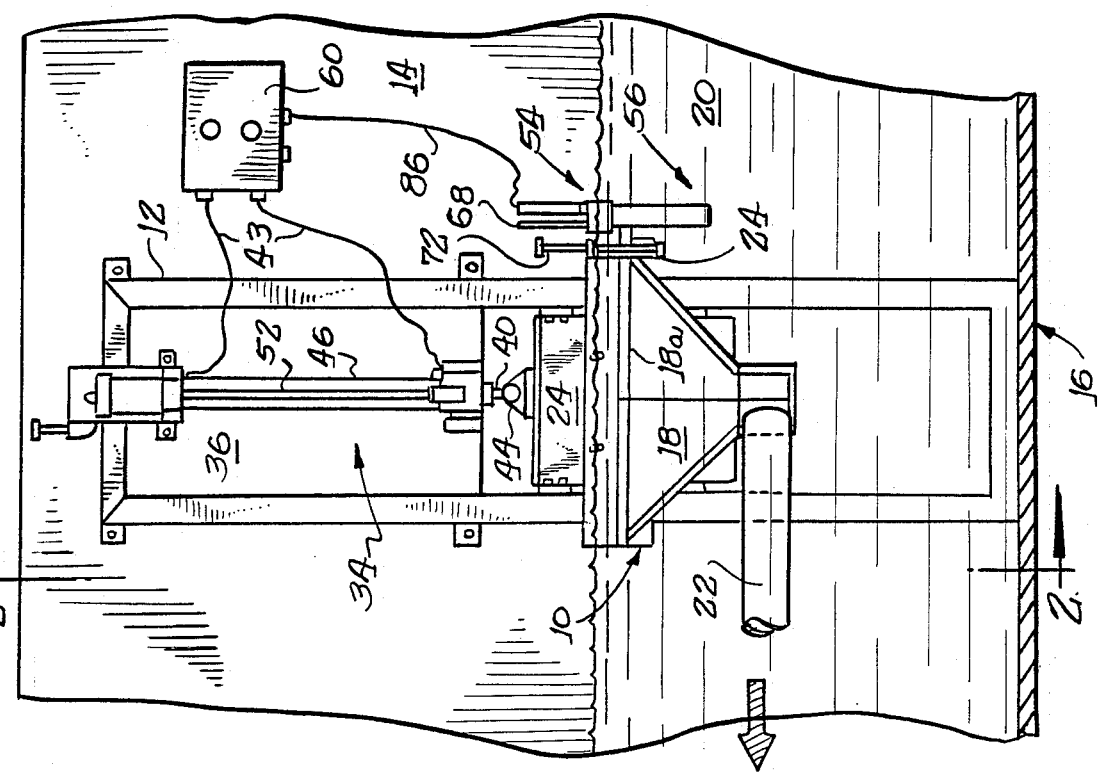
FIG. 1 is a front view of a gravity feed inlet for use in, e.g., the holding tank or reservoir of a water wash spray finish booth, the inlet being adapted to utilize the inventive device to automatically adjust the height of the inlet in response to changing water levels in the reservoir.

Turning to the Figures of the drawings, which are by way of illustration and not limitation, there is seen in FIGS. 1 and 2 an automatic height-adjustable gravity feed inlet means, generally indicated by 10, that may be advantageously used in conjunction with, e.g., a water wash spray finishing booth. The gravity feed inlet means 10 is mounted on a frame or track 12 secured to one of the side walls 14 of a holding tank or reservoir generally indicated by 16. The gravity feed means 10 includes a weir 18 substantially in the form of an inverted pyramid. The weir 18 is disposed in the reservoir 16 so that its upper edges or lips 18a are located adjacent to, but slightly below, the surface of the water 20 in the reservoir 16 so that the water (and sludge or other flotsam on the surface thereof) flows into the weir 18 at a steady rate. The water and sludge are drawn from the weir 18 through a flexible conduit 22 by a suction pump 23 (FIG. 7) and are brought to a location remote from the spray booth and reservoir 18 where they are processed for recycling, disposal, etc.

Figure 5:
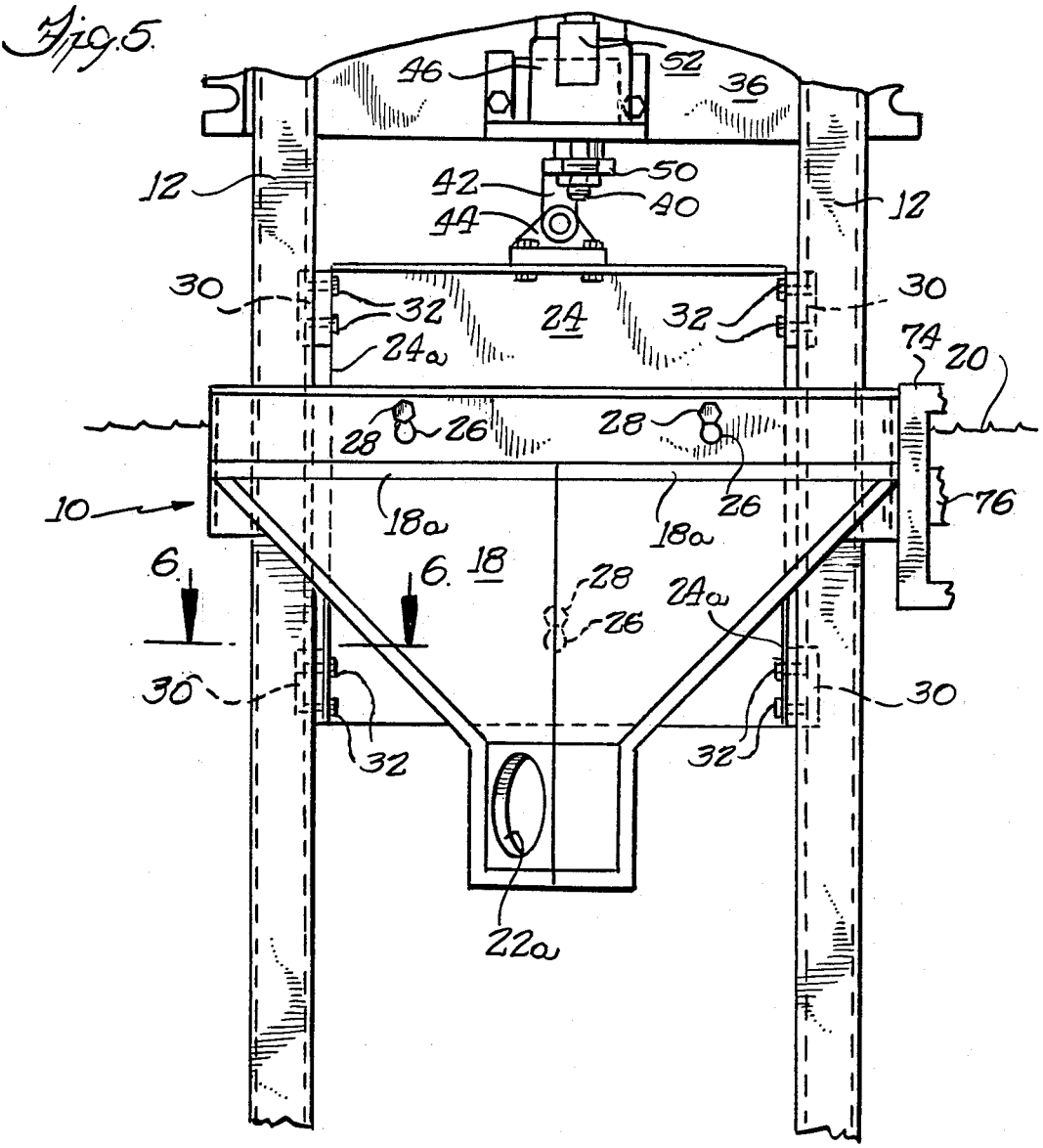
FIG. 5 is an enlarged, front view of the gravity feed inlet of FIG. 1.

As illustrated, the weir 18 is adapted to be supported by a slide carrier 24 that is mounted for movement vertically along the track 12. Best seen in FIG. 5, the weir 18 is removably secured to the slide carrier 24 by means of slots 26 having a standard pattern that overfits bolts 28 to provide a quick method of attaching different-sized weirs 18 to the slide carrier 24. Accordingly, the flow rate through the gravity feed means 10 may be varied as desired by securing an appropriately-sized weir 18 to the slide carrier 24. Typically, the lip 18a of the weir 18 should be maintained approximately 1 inch below the surface of the water 20. This provides a flow rate of approximately 35 gallons of water per minute for each foot of weir length. The top edge of the weir is in the shape of a triangle so that all of the water flowing across the top edge travels through substantially equal distances to the outflow pipe or conduit 22 at the bottom of the weir. Differences in velocity of water flow across the top edge would cause a vortex to form and the vortex will suck air and disrupt the flow. Thus, the triangular shape for the weir tends to equalize the flow rate at the inlet 22a of the conduit 22 between water flowing over adjacent links of the lip 18a and to prevent the formation of a vortex.

Figure 6:
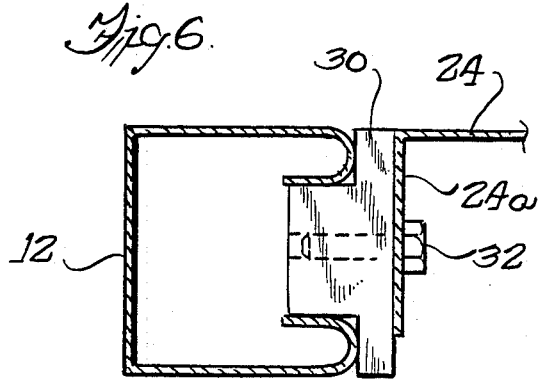
FIG. 6 is an enlarged cross-sectional view taken substantially along line 6—6 of FIG. 5 of the track along which the inlet moves.

To facilitate smooth movement of the slide carrier 24 along the track 12, nylon bearing blocks 30 are secured to the vertically-extending sides 24a of the carrier 24 by bolts 32. As best seen in FIG. 6, the bearing blocks have a T-shaped cross-section that snugly interfits within the track 12, and serves to cut through any sludge buildup in the track 12, thus ensuring smooth movement of the slide carrier 24. Additionally, the nylon from which the bearing blocks 30 are made is resistant to the chemicals normally encountered in the water 20.

To raise and lower the slide carrier 24 (and, consequently, the weir 18) fluid cylinder-piston means, generally indicated by 34, is supported on a mounting plate 36 integral with the upper portion of the track 12 above the surface of the water. The cylinder-piston means 34 is operatively connected to the slide carrier 24 and, as illustrated, includes a pneumatic cylinder 38 (seen in FIG. 2, where it is partially obscured by the track 12) having a piston rod 40 with a clevis 42 on the end thereof secured to a bracket 44 bolted to the slide carrier 24. Compressed air for actuating the pneumatic cylinder 38 is provided through tubing 43. Movement of the piston rod 40 is damped by a hydraulic cylinder or dash pot 46 having its piston rod 48 connected in parallel to piston rod 40 of the pneumatic cylinder by a bracket 50, hydraulic fluid being directed to the opposite sides of an internal piston associated with dash pot 46 through an external conduit 52.

In accordance with the invention, means is provided for actuating the pneumatic cylinder 38 to raise or lower the weir 18 in response to changing water levels in the reservoir 16. To this end, an environmentally protected liquid level sensor, generally designated by 54, is associated with the weir 18 to detect changing water levels with respect thereto. As opposed to directly measuring the water level of the contaminant-laden water in the reservoir 16, which could coat the sensor 54 and make it inoperative, the sensor 54 measures the liquid level of the environmentally clean test liquid having a level that corresponds to the water level in the reservoir 16.

As seen in FIGS. 3 and 4, the liquid level sensor 54 includes a probe 56 having an opto-electronic sensor 58 which may be, e.g., an infrared sensor. Alternatively, the sensor 58 may be an ultrasonic device. The sensor 58 is preferably of the type manufactured by Genleco, Inc. of Dallas, Texas, and is designated as a "PSF-502" polysulfone remote probe. Such a probe 56 utilizes light reflection and refraction to activate or deactivate a solid state switching circuit, seen in FIG. 1 and designated by 60, to raise or lower the weir 18. The sensor element 58 produces a beam of light and, if the probe is in a gaseous atmosphere, the light is reflected back into the element 58 to the light-sensing circuit 60, which registers the presence of light. When the probe is subjected to a liquid environment, the light is refracted out into the liquid and the absence of light is registered by the light-sensing circuit 60. The presence or absence of light actuates the switching circuit 60 to appropriately raise or lower the weir 18. However, if the sensor element 58 were to become coated with contaminants during use, it could no longer detect the absence of a liquid environment.

Accordingly, means is provided so that the sensor element 58 senses the level of a clean liquid that will not detrimentally coat the sensor element 58, the clean liquid being maintained at the level that corresponds to the level of the water in the reservoir 16. To this end, the sensor element 58 extends into a housing 62 having a cap 62a secured to a central tubing section 62b which is closed at its lower end by a flexible diaphragm 64 to maintain a fixed volume of a clean liquid 66, such as water or oil, within the housing 62. The housing 62 is vented to the atmosphere by a length of tubing 68 received in a threaded aperture 70 in the cap 62a so that, when the probe is disposed in the water 20, the pressure inside the housing 62 is the same as that outside, resulting in the level or top surface 66a (FIG. 4) of the test liquid 66 interior the housing being substantially equal to the water level 20a of the reservoir 16. Because the diaphragm 64 floats in the water 20, the clean liquid level 66a will always follow and be at the level 20a of the occluded water 20. The preferred liquid 66 is a light, clear oil such as mineral oil which will not evaporate as readily as would water.

The housing 62 is mounted to the weir 18 so that the position of the sensor element 58 is vertically adjustable with respect to the weir lip 18a. As illustrated, the sensor element 58 is movable by means of a threaded set screw 72 rotatably captured by a bracket 74 secured to the weir 18. A traveler block 76 movable along the threaded portion of the set screw shaft is connected to the central tube portion 62b of the housing 62 by screws 78. Accordingly, the height of the sensor 58 relative to the lip 18a of the weir 18 (and, consequently, the elevation of the weir lip 18a with respect to the surface of the water 20) may be adjusted by manipulation of the set screw 72.

To prevent localized wave action or other turbulence in the water 20 from causing the sensor 58 to give false readings, the lower portion of the central housing tube 62b and the diaphragm 64 are shielded by a tubular sheath member 80. The sheath 80 is secured to the central tube 62b by a screw 82 and includes air relief apertures 84 that vent trapped air from the interior of the sheath 80 and permit the diaphragm 64 to distend or constrict in response to the changing level of the water 20 with respect to the probe 56, Thus, local waves and turbulence that would otherwise act on the diaphragm 64 to affect the level of the liquid 66 within the probe 56 are dampened by the sheath 80 so that the sensor 58 detects average level of the water 20 in the reservoir 16.

To appropriately move the weir 18 in response to the signals generated by the sensor element 58, such signals are fed through a conductive cable 86 to the solid-state controller 60 (FIG. 1) which selectively directs compressed air to alternate sides of the pneumatic cylinder 38 through the tubing 43. The controller may be, e.g., of the type manufactured by Genelco, Inc., and designated as a "Levelite 510" controller.

Figure 7:
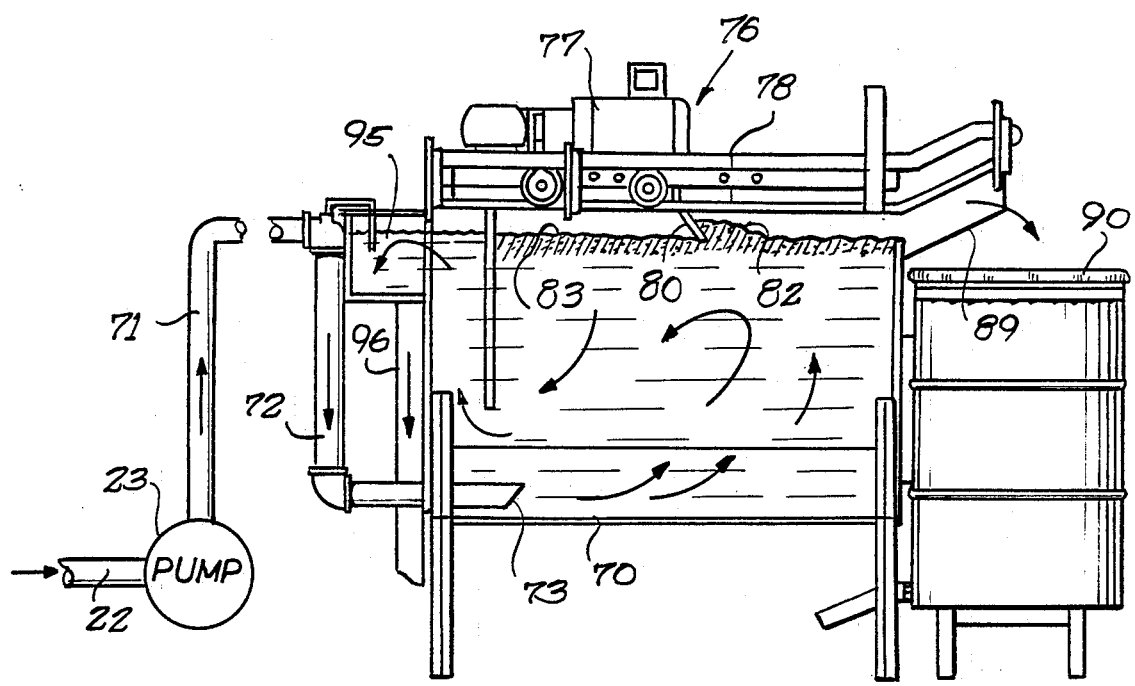
FIG. 7 is a diagrammatic view of a skimmer tank and skimmer blade for removing floating sludge.

A skimming apparatus, such as shown in U.S. Pat. No. 4,610,875, and is illustrated in FIG. 7 includes a skimmer tank 70 into which is pumped the water flowing from the flexible conduit 22 which is connected to the pump 23 for pumping over the lines 71 and 72 into a discharge end 73 of the pipe 72 for flowing in the general pattern shown in FIG. 7 within the tank 70. A skimming apparatus 76 comprises a motor-driven carriage 77 mounted on tracks 78 for travel across the top of the tank 70 with a skimming blade 80 being mounted on the carriage for skimming sludge 82 from the top surface 83 of the occluded water in the tank 70. The sludge 82 is skimmed by the blade 80 upwardly across an inclined ramp 89 to drop into a collecting mean such as a barrel 90. The water is returned from the tank 70 through an upper forward compartment 95 having a return pipe 96 which allows the water to be returned to the spray booth operation for reuse. It is particularly desirable in automatic systems in which the sludge removal carriage 77 is automatically cycled at periodic intervals to move the skimmer blade 80 across the top surface of occluded water to maintain the water level in the skimmer tank 70 at a predetermined height, for example, within a one-eighth to one-fourth of an inch water level variation so that the skimmer blade is always removing sludge from the top layer of water with a light skimming action across the top of the water in the tank 70. The adjustable weir 18 is particularly suited to assuring that there is a continual, even flow of water into the tank 70, for example, at about 35 gallons per minute whenever the system is in operation, and particularly, at startup when the water level in the main spray booth tank 16 is lowered substantially either by filling the pipes if they are empty or by placing water into the spray washers and by flowing water down the baffle blades which are coated with water to catch paint spray particles. Thus, an even flow of water across the weir maintains a more constant water level in the skimming tank 70.

A brief review of the operation of the illustrated invention will now be given. It will be understood that it is preferred that upon startup and for a continuous time of operation thereafter that there be sufficient water always in the skimmer tank 70 that the skimmer blade 80 be effective to reach the floating sludge 82 and to push the floating sludge up the ramp 89 and into the barrel 90.

When the water system is shut down and the water 20 in the water reservoir 16 is at its highest level, the weir lip 18a will be positioned above the surface of the water 20 and the probe 56 is moved along the set screw 72 so that sensor element 58 is located 1 inch above the weir lip 18a. At this time, the level of the liquid 66 in the probe 56 will be such that the sensor element 58 is suspended in a gaseous atmosphere that causes the light emitted by the probe to be reflected back into the element 58. When the light-sensing circuit is activated just prior to the startup of the spray booth, the circuit 60 will register the presence of light and cause compressed air to be directed through the tubing 43 to the pneumatic cylinder 38 to lower the weir 18 until the water level in the reservoir is such to cause the liquid 66 in the probe 56 to touch the sensor element 58, at which time the weir lip 18a will be 1 inch below the surface of the water 20, causing the light emitted by the probe 56 to be reflected out into the liquid 66. The circuit 60 will then register the absence of light and will cease to direct compressed air to the cylinder 38, thus fixing the position of the weir lip 18a with respect to the level of water 20 in the reservoir 16. In a similar manner, the sensor element 54 will detect subsequent changes in the water level and appropriately signal the circuit 60 to maintain the weir lip 18a at its desired level. Also, if the water level rises in the holding tank the sensor senses this and raises the weir 18 to keep the weir lip 18a at about one inch below the top surface 20a of the occluded water. Thus, the weir 18 is raised and lowered to maintain the weir at the desired skimming level and to maintain an even and more constant flow of water through the weir.

The liquid level sensor for occluded liquid such as water containing sludge may be used with devices other than a weir. For example, the water level sensor, herein disclosed, may be connected to a water inlet valve to open the valve to admit water into the reservoir to make up water that has been evaporated or otherwise lost from the water reservoir. When the water level is raised to the proper level, the liquid level sensor will detect the new raised level and send a signal to close the water inlet valve so that the make-up water flow into the reservoir is stopped.

From the foregoing it can be seen that an improved device for reliably adjusting the height of an inlet of a gravity feed device has been provided. While the invention has been described in terms of a preferred embodiment, there is no intent to limit the invention to the same. On the contrary, it is intended to cover all equivalents and modifications within the scope of the appended claims.

What is claimed is:

1. In a system for accumulating and removing floating pain sludge from the top of a body of occluded water, said system comprising:
   a stationary frame having a first reservoir for collecting occluded water bearing sludge therein, a vertically adjustable means including a weir means disposed in said first reservoir and vertically movable in said first reservoir in water to achieve an optimum skimming of the sludge from the first reservoir despite variations in water level in said first reservoir, a second reservoir having an inlet for receiving the occluded water from the first reservoir and from the surface of which floating sludge is removed, means for conveying the water and sludge from the weir means in the first reservoir to the inlet of said second reservoir, and means including a liquid sensing means attached to and traveling with said weir means in said first reservoir to actuate said vertically adjustable means and said weir means vertically to maintain a flow of water and sludge from said first reservoir through said weir and into the second reservoir, said liquid sensing means comprising a flexible diaphragm disposed in the water in the first reservoir and containing a test liquid separated by said diaphragm from said water in said first reservoir with the diaphragm constricting and expanding with changes in water level in the first reservoir.

2. For use in a reservoir having an outlet and holding a liquid whose level varies, an adjustable-height gravity feed inlet comprising, in combination, frame means having a vertical track means thereon at the reservoir, weir means carried on the track means for movement therealong, means for moving the weir means along the track means, an outlet means connected to the weir means for liquid flow through and from the weir means, means for actuating the moving means in response to changes in the liquid level in the reservoir including an electronic sensor secured to the weir means capable of detecting the level of a liquid relative to the sensor, an elongated housing connected to and for the electronic sensor having upper and lower ends with the lower end disposed in the liquid in the reservoir, the housing being open at its lower end and vented to the atmosphere at the upper end to equalize the pressure between the interior of the housing and the atmosphere ambient thereof, flexible diaphragm means secured to the housing so as to seal the open lower end therof, test liquid within the diagram and isolated from the liquid of in the reservoir, the flexible diaphragm constricting or expanding in response to changing liquid levels in the reservoir so that the level of the test liquid stays substantially the same as that of the level of the liquid in the reservoir.

3. The combination of claim 2 wherein the sensor is movably secured to the weir to adjust the vertical relation between the sensor and the weir to control the relative position of the weir with the level of water in the reservoir.

4. The combination of claim 2 further comprising sheath means secured to extend downward from the lower end of the housing to shield the diaphragm from localized turbulent conditions of the liquid in the reservoir, the sheath means including air relief apertures therein to permit air trapped interior of the sheath means to escape therefrom.

5. In a system for accumulating and removing floating sludge from the top of a body of occluded water, said system comprising:

a first reservoir for collecting occluded water bearing sludge therein, a vertically adjustable means including a weir disposed in said first reservoir to remove liquid bearing the sludge from the first reservoir, a second reservoir having an inlet for receiving the occluded water from the first reservoir and from the surface of which floating sludge is removed, means for conveying the water and sludge from the weir to the inlet of the second reservoir, skimmer means at the second reservoir for skimming the top surface of the water in the second reservoir to remove floating sludge from the top surface, and connected to said means for conveying water and sludge to deliver the water and sludge to the inlet of said second reservoir, and means including a liquid sensing means associated with said first reservoir to actuate said weir vertically to maintain a flow of water from said first reservoir through said weir and into the second reservoir to maintain the surface level in the second reservoir at a height that skimmer means remains effective, said liquid sensing means comprising a flexible diaphragm disposed in the water in the first reservoir and containing a test liquid separated by said diaphragm said water in said first reservoir with the diaphragm from constricting and expanding with changes in water level in the first reservoir, said liquid sensing means detecting the raising or lower of the level of the test liquid; said liquid sensing means being connected to said weir and shifting vertically with said water.

6. A system in accordance with claim 5 including a vertically adjustable means having a power driven actuator means for driving said weir and said liquid sensing means in the vertical direction.

7. A system in accordance with claim 6 in which said vertically adjustable means includes a slide means and a slide support mounted at said first reservoir with said slide means sliding upwardly and downwardly on said slide support as moved by said actuator means in response to actuation by said liquid sensing means.

* * * * *

UNITED STATES PATENT AND TRADEMARK OFFICE
CERTIFICATE OF CORRECTION

PATENT NO. : 4,867,872

DATED : September 19, 1989

INVENTOR(S) : Russell, et al

It is certified that error appears in the above-identified patent and that said Letters Patent is hereby corrected as shown below:

Column 4, Line 31, after "probe", "is" was inserted in the patent but no change was found in the file.

Column 4, Line 47, after "water", "level" was deleted in the patent, but no change was found in the file.

Column 6, Line 65, change "pain" to --paint--.

Column 7, Line 46, change "therof" to --thereof--.

Column 7, Line 47, change "diagram" to --diaphragm--.

Column 7, Line 47, after "liquid" delete "of".

Column 8, Line 38, after "diaphragm" insert --from--.

Column 8, Line 39, after "diaphragm" delete "from".

Column 8, Line 42, after "liquid" change semicolon to comma.

Signed and Sealed this

Ninth Day of October, 1990

*Attest:*

HARRY F. MANBECK, JR.

*Attesting Officer*     *Commissioner of Patents and Trademarks*